US005549287A

United States Patent [19]

Loucks

[11] Patent Number: 5,549,287
[45] Date of Patent: Aug. 27, 1996

[54] AUTOMOBILE BODY PARTS HOLDER ASSEMBLY

[76] Inventor: Howard C. Loucks, 807 Delaware Ave., Delmar, N.Y. 12054

[21] Appl. No.: 259,489

[22] Filed: Jun. 14, 1994

[51] Int. Cl.⁶ .................................................... B66F 5/04
[52] U.S. Cl. .............................. 269/17; 269/51; 269/60; 269/69; 269/71; 269/296; 254/7 R
[58] Field of Search .................................. 269/17, 69, 50, 269/51, 60, 296, 71, 45; 254/133, 134, 7 R, 7 B, 2 R, 2 B, DIG. 16

[56] References Cited

U.S. PATENT DOCUMENTS

| | | | |
|---|---|---|---|
| 1,041,101 | 10/1912 | Kobzy . | |
| 1,670,253 | 5/1928 | Gilbert et al. | 269/45 |
| 1,750,199 | 2/1928 | Spann . | |
| 1,792,612 | 2/1928 | Staley . | |
| 1,823,204 | 9/1931 | Long | 269/17 |
| 3,040,908 | 6/1962 | Johnson | 254/2 B |
| 3,218,056 | 11/1965 | Kaplan et al. | 269/17 |
| 3,298,648 | 1/1967 | Sepanski . | |
| 4,232,357 | 11/1980 | Dietz . | |
| 4,253,649 | 3/1981 | Hewson | 269/45 |
| 4,500,077 | 2/1985 | Coxon | 269/45 |
| 4,560,151 | 12/1985 | Grundy | 269/17 |
| 4,598,919 | 7/1986 | Letard, et al. . | |
| 4,665,638 | 5/1987 | Morton . | |
| 4,796,864 | 1/1989 | Wilson | 254/425 |
| 4,804,162 | 2/1989 | Rice . | |
| 4,838,199 | 6/1989 | Weber | 269/17 |
| 4,848,717 | 7/1989 | Bevill . | |
| 4,932,391 | 6/1990 | Bierdeman . | |
| 4,932,628 | 6/1990 | Pacheco . | |
| 4,949,944 | 8/1990 | Groff | 269/45 |
| 4,971,292 | 11/1990 | Craig | 254/7 R |
| 5,128,838 | 7/1992 | Brandess . | |

*Primary Examiner*—Robert C. Watson
*Attorney, Agent, or Firm*—Heslin & Rothenberg, P.C.

[57] ABSTRACT

A automobile body parts holder assembly, for, in particular, fenders and automobile body parts is disclosed herein. An adjustable, portable automobile parts holder is removably attached to a fender attachment unit, an automobile door attachment unit, a hood attachment unit, or a workbench attachment unit. The base structure includes a base having a front and a rear. At the rear of the base, there is a vertically adjustable support leg extending vertically upward. This support leg is adjustable for various heights. At the top of the vertically adjustable support leg is a horizontally displaced rotatable cantilevered support arm. This support arm permits the attachment of the various automobile body part attachment units, such as the fender attachment unit, or the door attachment unit. The support arm rotates 360 degrees about its axis so that when an automobile attachment unit and body part is attached to the support arm, a mechanic may have access to all locations of the body part. The height adjustability of the support leg also permits a mechanic to select a comfortable position when working on an attached body part.

20 Claims, 4 Drawing Sheets

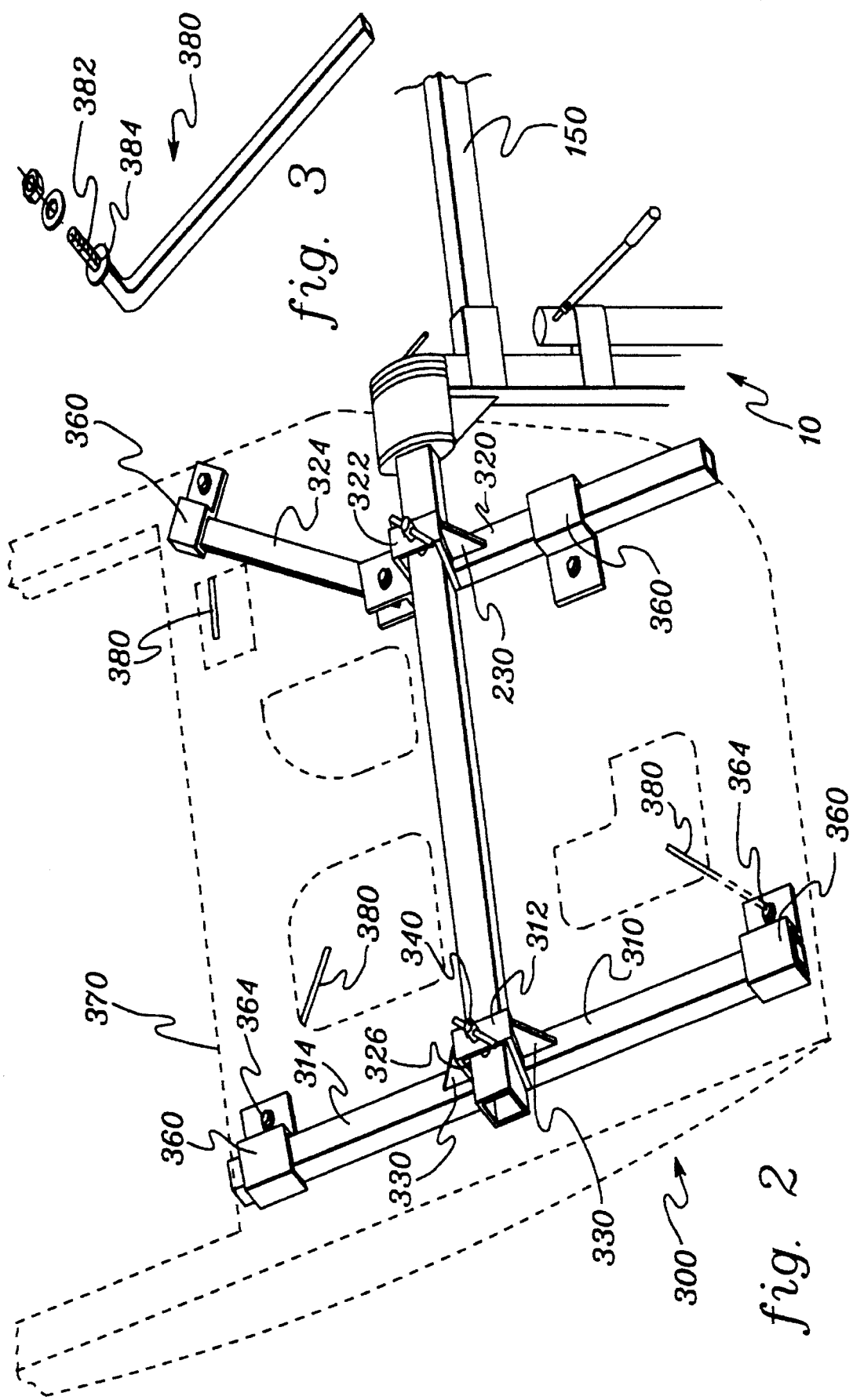

5,549,287

AUTOMOBILE BODY PARTS HOLDER ASSEMBLY

BACKGROUND OF THE INVENTION

1. Technical Field

The present invention generally relates to supports for heavy machine parts. More particularly, the present invention relates to supports for automobile body parts.

2. Background Information

It is often necessary for damaged automobile body parts to be removed from an automobile for repair. Currently, there are numerous devices on the market designed to hold damaged automobile body parts. In order to facilitate the repair of damaged automobile body parts, some parts may be removed from the automobile, and attached to a body parts holder so that a repair person may practice his or her trade. A typical autobody repair person's tasks includes replacing automobile door skins or panels, straightening doors, performing prep work on doors and fenders, and then painting the doors and fenders.

A problem with many of the devices currently on the market is that they are not sturdy enough to allow an auto body mechanic or repair person to perform significant work on an attached body part. For instance, the repair of an attached automobile body part often involves substantial grinding, filing and sanding. This heavy duty type of work results in the application of heavy loads onto the parts holder. Therefore, injury may result if the automobile body parts holder were to tip over from the loads applied to parts holder and attached part.

Moreover, current devices do not allow a repair person sufficient access to the attached body part being worked on. Most current devices do not permit an automobile body part to be attached to the holder. Instead, body parts are simply set on top of the body part holder. As a result, it is believed that many body part holders do not allow the auto body repair person to rotate the attached body part for access to various locations of the body part. However, such a capability is useful when a repair person is, for example, replacing a door skin, which requires access to both sides of the door panel. In addition, many current devices do not have the capability for allowing the attached body part to be vertically raised and lowered. Such a capability, however, is often desirable to the auto body repair person who wants to modify work height to a different and more comfortable level.

Finally, it is believed that present devices on the market only possess the capability to handle one type of automobile body part. For instance, there are several devices which only accommodate automobile fenders. Also, with most of these devices, automobile parts are not attached to the holder, but simply rest thereon. Since a body repair shop repairs numerous different automobile body parts, it would be most useful for a parts holder with the capability to accommodate numerous different body parts. Furthermore, it would be beneficial to have a parts holder with the capability to support more than one body part at the same time.

Thus, a need exists for a sturdy automobile body parts holder which permits easy access to all locations of the attached body part, and one that can accommodate different types of body parts.

SUMMARY OF THE INVENTION

Briefly, the present invention satisfies the need for an automobile body parts holder that is stable and sturdy enough to support heavy automobile body parts, is versatile enough to allow the repair person adequate flexibility in accessing various locations on the automobile body part, is adaptable for different automobile body parts, and may hold more than one body part at a time. Therefore, the aforementioned background problems are obviated by the adjustable, portable automobile body parts holder of this invention.

The present invention comprises an adjustable and portable automobile parts holder. The holder has a base which has a front and a rear. A vertically adjustable support leg extends vertically upward from the rear of the base. Attached to the top of the support leg and extending therefrom is a substantially horizontally displaced rotatable cantilevered support arm. This support arm receives an automobile body part attachment unit, such as a fender attachment unit, or a door attachment unit.

Preferably, the vertically adjustable support leg comprises a telescoping tubing arrangement (an inner tube slidably insertable within an outer tube). The support leg includes means for being raised and lowered. A fender attachment unit may be slidably engageable to said rotatable cantilevered support arm of the body parts holder. This fender attachment unit has a plurality of fender attachment connectors for attaching an automobile fender thereon. In addition, a door attachment unit may be slidably engageable to said rotatable cantilevered support arm of the body parts holder.

These, and other objects, features and advantages of this invention will become apparent from the following detailed description of the preferred embodiment of the invention taken in conjunction with the accompanying drawings.

BRIEF DESCRIPTION OF THE DRAWINGS

FIG. 2 is an isometric view of a portion of the automobile body parts holder of the present invention in combination with the door attachment unit of the present invention with a phantomed automobile door attached thereto.

FIG. 3 is an enlarged view of the elongated rod of the present invention used to connect an automobile body part to the automobile door attachment unit of the present invention.

BEST MODE FOR CARRYING OUT THE INVENTION

Figure 1:
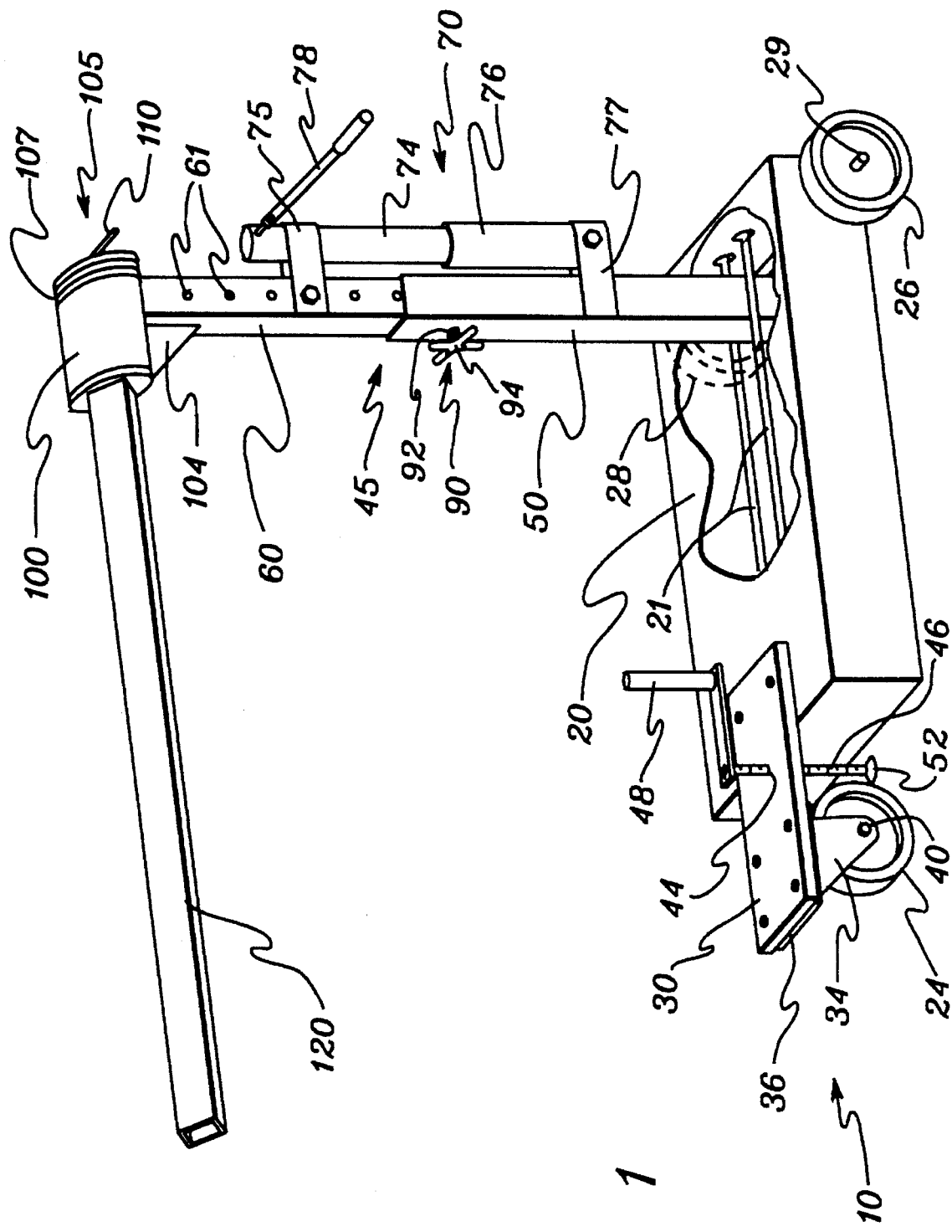
FIG. 1 is an isometric view, partially cutaway, of the automobile body parts holder of the present invention.

Referring now to the drawings, and more particularly to FIG. 1, automobile body parts holder 10 is shown with base 20 assembled thereto. Base 20 may consist of a metal casing with concrete filler. Alternatively, base 20 may comprise angle iron or steel tubing. Ready mixed concrete may be used to fill base 20. In addition, base 20 may have steel reinforcing rods 21 running through the concrete to increase the strength and structural integrity of base 20. Concrete is sufficiently heavy so that body parts holder 10 is stable when substantial work, such as grinding, filing and sanding, is performed on a heavy automobile body part attached thereto. Therefore, utilizing concrete in base 20, or a comparably heavy material, will prevent body parts holder 10 from tipping over when substantial work is performed on a weighty automobile body part.

In one aspect of the present invention, three wheels are mounted to base 20, a front wheel 24, and two rear wheels 26 and 28. While there are various materials one may select for the wheels, hard rubber is preferred because of its elasticity. However, in lieu of hard rubber, plastic or wood may be substituted therefor. Front wheel 24 is attached to base 20 by a top plate 30, which is attached to the top of base 20. Underneath the top plate 30, and attached thereto is a second plate 36. Extending vertically downward from second plate 36 are two side walls 34. These side walls have an aperture for accommodating a pin 40. This pin passes through a hole (not shown) centered in front wheel 24, thereby permitting front wheel 24 to rotate. A conventional bearing assembly (not shown) attached to second plate 36 provides front wheel 24 with a full swivel motion.

In addition, front wheel 24 may lock in place to prevent movement of body parts holder 10. Preventing movement of the body parts holder 10 is important during critical times, such as during the mounting of an automobile body part, and while a mechanic performs work on an attached body part. Several means exist to prevent movement of body parts holder 10. For instance, a threaded aperture 44 is formed in top plate 30. A threaded rod 46 is threaded to aperture 44, and a crank handle 48 is attached to the top of threaded rod 46. The bottom of threaded rod 46 has a cup-shaped attachment 52. By rotating crank handle 48, threaded rod 46 may be moved upward or downward. Therefore, by rotating crank handle 48 in a first direction, the front of base 20 may be lifted upwards, which also lifts front wheel 24 off the ground, in turn preventing movement of body parts holder 10. Furthermore, by rotating crank handle 48 in a second direction, the front of base structure 20 may be lowered. Once front wheel 24 reaches the ground, automobile body parts holder 10 may be moved. Other locking means may also be selected; for example, front wheel 24 may be fitted with a pedal brake which is common on carriages.

The two rear wheels 26 and 28 are connected to base 20 by a metal pin 29 which may extend through the rear of base 20 and out the sides of the metal casing of base 20. Pin 29 extends out of the side walls of metal casing 20 to receive apertures (not shown) in rear wheels 26 and 28. Pin 29 may be attached to base 20 by pouring the ready mix concrete over the pin while it sits inside base 20. Two holes (not shown) in the outer metal casing of base 20 hold pin 29 securely in place.

Mounted vertically on the rear of base 20 is a vertically adjustable support leg 45. This vertically adjustable support leg 45, in the preferred embodiment, comprises an inner tube 60 and an outer tube 50. The bottom of outer tube 50 may be set in the concrete of base 10. Vertically adjustable support leg 45 may be further anchored to base 20 by attaching the bottom of support leg 45 to steel reinforcing rods 21 set in the concrete. Preferably, the bottom of vertically adjustable support leg 45 is welded to steel reinforcing rods 21. Inner tube 60 is slidably inserted inside of outer tube 50. These tubes may, for example, comprise square steel tubing. The combination of inner tube 60 and outer tube 50 form a telescoping arrangement as depicted in FIG. 1. The combination of inner tube 60 and outer tube 50 permit the vertical adjustment of support leg 45. Since inner tube 60 moves vertically within the cavity of outer tube 50, inner tube 60 preferably has a length which is greater than outer tube 50.

Inner tube 60 and outer tube 50 have been illustrated as hollow tubes which are square in cross section. Tubes which are circular in cross section, however, may also be used. For purposes of economy of manufacture, however, hollow and square tubing is preferred. Yet, the use of circular tubing is equally satisfactory in performance.

A screw jack 70 is attached to both inner tube 60 and outer tube 50. Screw jack 70 is attached to vertically adjustable support leg 45 at two locations. A first brace 77 connects an outer shaft 76 to outer tube 50. A second brace 75 connects an inner shaft 74 to inner tube 60. These braces are preferably welded onto inner tube 60 and outer tube 50. However, they may also be bolted thereon. One such screw jack 70 is manufactured by Fulton Performance Products, 1912 South 87nd Street, Milwaukee, Wis. 53219, and is known as the FULTON screw jack. As is shown in FIG. 1, screw jack 70 comprises inner shaft 74 and outer shaft 76. Both shafts are circular in cross-section and form a telescoping tubing arrangement. This telescoping tubing arrangement permits inner shaft 74 to slidably move within outer shaft 76. Attached to screw jack 70 is a handle 78 which, when rotated, permits inner shaft 74 to be raised and lowered. The raising of inner shaft 74 in turn raises inner tube 60 of vertically adjustable support leg 45.

FULTON screw jack 70 permits the lowering and raising action because of an axially displaced screw (not shown) which sits centrally inside inner shaft 74 and outer shaft 76. This vertically displaced screw is meshed with a gear system (not shown), which in turn is attached to handle 78. The rotation of handle 78, in combination with the gear system, raises and lowers the vertically displaced screw. FULTON screw jacks are commonly known, and may be purchased in many hardware stores. Other suitable means for raising and lowering may also be used and it should be understood that the present invention is not limited to any particular means. For instance, a utility jack or a hydraulic jack may be selected.

A locking means 90 is mounted on outer tube 50 to lock inner tube to outer tube. A threaded aperture (not shown) passes through outer tube 50, and a threaded bolt 92 threads thereto. Attached to threaded bolt 92 is a handle 94. By turning handle 94, threaded bolt 92 may be moved in and out of the threaded aperture. When threaded bolt 92 is threaded inward, pressure from the end of threaded bolt 92 against inner tube 60 holds inner tube 60 securely in place.

Another means for locking may comprise a plurality of apertures 61, as formed on inner tube 60. Outer tube 50 may have an aperture (not shown) through which a pin (not shown) may be inserted. When this pin is aligned and inserted through the apertures of both the inner and outer tubes, the inner and outer tubing arrangement will be secured.

Mounted to the top of inner tube 60 is a sleeve 100. In one embodiment, sleeve 100 is circular in cross section, hollow, and made of steel. As set forth in FIG. 1, sleeve 100 lies in a substantially horizontal plane. Sleeve 100 is preferably welded to the top of inner tube 60. A support wedge 104 may be used to anchor sleeve 100 in its substantially horizontal plane. Support wedge 104 is preferably made of steel and welded to both the top of inner tube 60 and sleeve 100. Extending horizontally from within the hollow sleeve 100 is a rotatable cantilevered support arm 120.

Support arm 120 fits snugly and removably within sleeve 100. Support arm 120 may be rotated about its axis a full 360 degrees, either clockwise or counterclockwise. A locking assembly 105, which includes a handle 110, permits support arm 120 to be locked into place. Locking assembly 105 may have a threaded bolt (not shown) which threads to a nut (not shown) formed on support arm 120. One or more rotatable disks 107 may be attached to the locking assembly 105. Support arm 120 is preferably made of square steel tubing. As depicted in FIG. 1, support arm 120 is sufficiently long for body part holder attachment units to be attached thereto. For instance, a fender attachment unit 200 may be removably coupled to body parts holder 10 of the present invention. Fender attachment unit 200 is designed to hold automobile fenders. Additionally, an automobile door attachment unit 300 may be removably attached to body parts holder 10 to hold automobile doors thereto. A hood attachment unit (not shown) may also be attached to the body parts holder 10 to hold automobile hoods thereto. A workbench assembly (not shown) may also be attached to automobile parts holder 10.

Figures 4, 5:
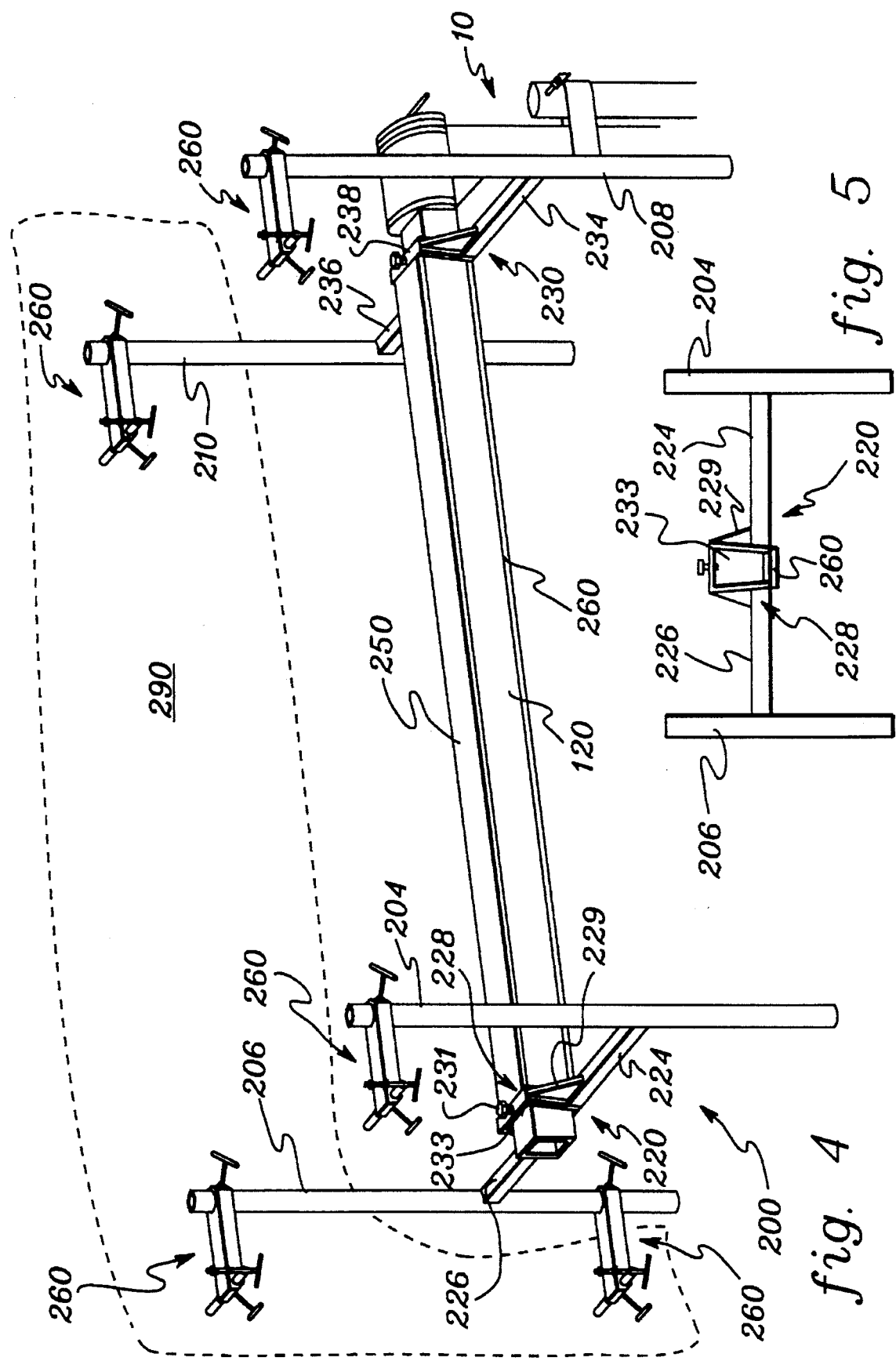
FIG. 4 is an isometric view of the automobile body parts holder of the present invention in combination with the fender attachment unit of the present invention, in conjunction with a phantomed automobile fender attached thereto.
FIG. 5 is an end view of the fender attachment unit of the present invention.

As depicted in FIG. 4, the fender attachment unit 200 is shown removably attached to automobile body parts holder 10. Fender attachment unit 200 is slidably attached to rotatable cantilevered support arm 120 of automobile body parts holder 10. The fender attachment unit has four rods, a first rod 204, a second rod 206, a third rod 208, and a fourth rod 210. Each of these rods are connected to another rod via two connection arms, a first connection arm 220, and a second connection arm 230. Therefore, first rod 204 is connected to second rod 206 with first connection arm 220, and third rod 208 is connected to fourth rod 210 with second connection arm 230. Preferably, the connection point on each of the rods 204, 206, 208, and 210 is substantially centrally located along the length of the rods. As seen best from the end view of FIG. 5, the connection of the first and second rods, and the third and fourth rods, with the two connection arms, form two H-shaped members.

Instead of being single unitary arms, each of the connection arms 220 and 230 may further be divided into two segments. For instance, first connection arm 220 may comprise a first segment 224 and a second segment 226. Second connection arm 230 may comprise a third segment 234 and a fourth segment 236. Each segment is preferably of equal length. Two corresponding segments may be joined to a collar 228 or 238. For instance, segments 224 and 226 may be attached to first collar 228. Segments 234 and 236 may similarly be attached to second collar 238. Each collar 228 and 238 has a channel 233 to receive rotatable cantilevered support arm 120. Since support arm 120 is square in cross-section, channel 233 of collars 228 and 238 are similarly shaped so that support arm 120 fits therein. Collars 228 and 238 have a locking mechanism to secure support arm 120 to fender attachment unit 200. As shown in FIG. 4, this locking mechanism may comprise a threaded aperture (not shown) formed in the top of collars 228 and 238. By tightening a threaded bolt 231, elongated support arm 120 may be attached securely in channel 233.

In the preferred embodiment and as depicted in FIG. 5, each collar 228 may be shaped with one of its sidewalls angled inward. This angled configuration will result in a wider collar at the top than at the bottom. When elongated support arm 120 is forced downward, the angled configuration will result in a more secure contact.

The two collars 228 and 238 are joined to one another by a top center arm 250 and a bottom center arm 260. As depicted in FIG. 4, center arms 250 and 260 may be flat. In the preferred embodiment, these center arms are made of steel. Top center arm 250 extends from the top of collar 228 and attaches to the top of collar 238. Bottom center arm 260 extends from the bottom of collar 228 and attaches to the bottom of collar 238. Preferably, center arms 250 and 260 are welded to collars 228 and 238.

Each of the four rods 204, 206, 208, and 210, may have a plurality of fender attachment connectors 260 fitted thereon. Preferably, the number of fender attachment connectors should not exceed a total of eight connectors. However, the number of connectors 260 attached to the rods may vary, depending on the particular automotive situation presented. These connectors 260 are slidably attached to the rods, easily adjustable and removable. An individual fender attachment connector 260 is shown in detail in FIG. 6. Fender attachment connector 260 comprises a bar 261, which removably and slidably attaches to the end of the four rods. Aperture 262 receives one of the rods, while T-bar 264 provides a means for securing bar 261 to one of the rods. When a location along one of the rods is selected, bolt 265, which is attached to T-bar 264, is tightened to secure fender attachment connector 260 in position. On the opposite end of bar 261 of fender attachment connector 260 is a second aperture 270 extending through bar 261 in a direction orthogonal to the axial direction of aperture 262. Second aperture 270 removably and slidably receives a second bar 273. A second T-bar 275 secures bar 270 in second aperture 270 in the same fashion as T-bar 264.

Fastener 280 provides the means for fastening fender attachment connector 260 to an automobile fender 290. Fastener 280 comprises a T-bar 281, a threaded bolt 283, a nut 285, and a washer 287. The combination of these elements permits fender attachment connector 260 to removably attach automobile fender 290 to fender attachment unit 200.

Figure 6:
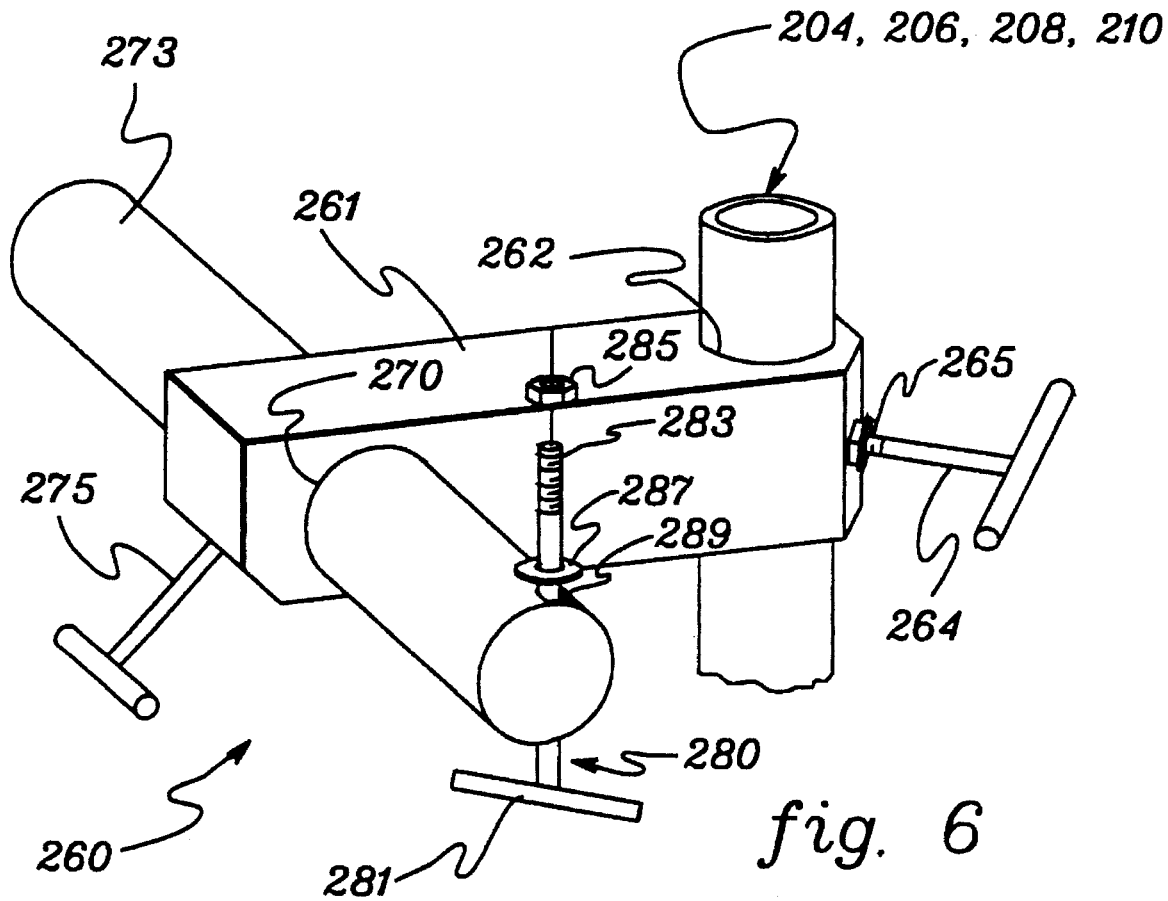
FIG. 6 is an enlarged view of a fender attachment connector of the present invention.

While in FIG. 6 bolt 283 is shown passing through an aperture 289, an equally satisfactory structure may include a hollow tube (not shown) fastened to the end of bar 273 for bolt 283 to pass through.

Figure 7:
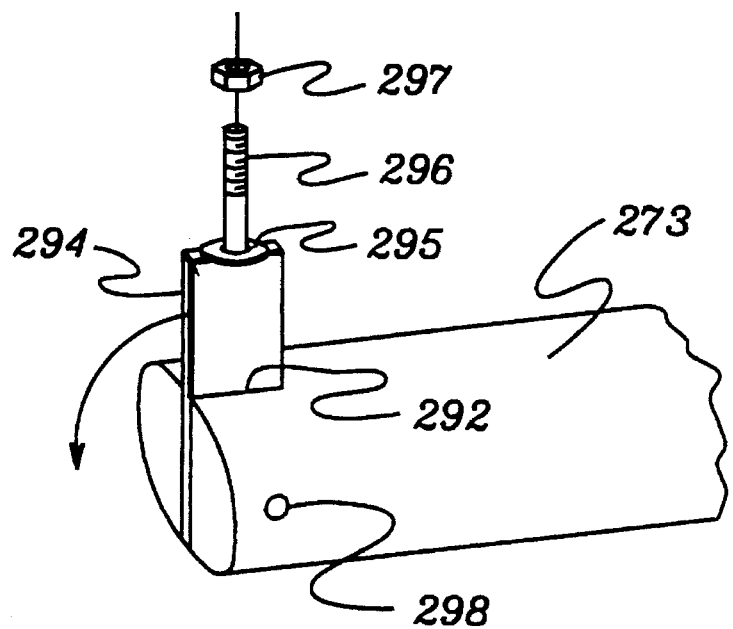
FIG. 7 is an enlarged view of a portion an another embodiment of a fender attachment connector of the present invention.

In FIG. 7, an alternate embodiment for fastener 280 is shown. An axial slit 292 is cut in bar 273. This axial slit 292 accommodates rotatable member 294, which includes a washer 295, a threaded bolt 296, and a nut 297. Rotatable member 294 and bar 273 both have an aperture passing therethrough to accommodate pin 298. Rotatable member 294 pivots about pin 298.

As shown in FIG. 2, door attachment unit 300 allows for an automobile door 370 to be attached to body parts holder 10. Door attachment unit 300 may comprise four arms, a first arm 310 connected to a second arm 314, and a third arm 320 connected to a fourth arm 324. The first arm is connected to the second arm via a first connecting collar 312. Third arm 320 is connected to fourth arm 324 via second connecting collar 322. The connecting collars are shaped with a housing 326 to receive rotatable cantilevered support arm 120 of automobile body parts holder 10. In the same manner as fender attachment unit 200, one of the side walls of connecting collars 312 and 322 may be angled inward. Each of arms 310, 314, 320 and 324 are preferably welded to their corresponding connecting collar. In addition, a triangular post 330 may be used to insure a secure attachment of the connecting collars to their respective arms. It is also preferable to hinge attach one or more of arms 310, 314, 320, and 324, to connecting collars 312 and 332. As shown in FIG. 2, arm 324 is hinge attached to collar 322. A hinge attachment of this type permits arm 324 to be adjusted for fitting a car door 370 thereon.

In the preferred embodiment, the combination of first arm 310, second arm 314, and first connecting collar 312 forms a separate structure from the combination of third arm 320, fourth arm 324, and second connection collar 322. However, the use of connection arms (not shown) may be used to form a unitary structure, in a similar fashion to fender attachment unit 200.

While the preferred embodiment envisions four arms, an alternate embodiment envisions only two arms. Therefore, instead of connecting two arms together, such as first arm 310 and second arm 314, a single arm may suffice.

A locking bolt 340 is mounted on each of the connecting collars 312 and 322. Locking bolt 340 may comprise a threaded hole (not shown) set in the top of connecting collars 312 and 322, in combination with a threaded bolt (not shown). Alternatively, a threaded nut (not shown) may be attached over a hole (not shown) on connecting collars 312 and 322. A T-handle may be utilized to facilitate ease of tightening and loosening. Once collars 312 and 332 of door attachment unit 300 are slidably attached to rotatable cantilevered support arm 120, collars 312 and 322 may be tightened thereto by threading the threaded bolt to the threaded hole or threaded nut.

On each arm 310, 314, 320, and 324, a connection bracket 360 is shown. Connection bracket 360 is slidable along the arm to which it is attached. Preferably, four brackets 360 are attached to door attachment unit 300. However, the number of brackets 360 used may vary, depending on the automotive situation presented. An aperture 364 permits a typical nut and bolt to secure car door 370 to bracket 360. Various different structures for connection bracket 360 may be selected, and it is understood that the structure should not be limited to that shown in FIG. 2.

Since it is often difficult to reach into the inner housing of car door 370, an elongated rod 380 facilitates ease of attachment of bracket 360 to car door 370. As shown in detail in FIG. 3, rod 380 is elongated with a threaded bolt 382 attached to its end, and attached to the base of threaded bolt 382 is a rim 384. The rod is bent to a substantially ninety degree angle. Usage of rod 380 is depicted in FIG. 2, bracket 360 is connected to door 370, at various places.

There are many variations which can be practiced in the scope of this invention. First, various other attachment units may be attached to automobile parts holder 10; for instance, a hood attachment unit (not shown) may be used to attach automobile hoods. Furthermore, a second rotateable cantilevered support arm 150 may also be attached to vertically adjustable support leg 45. Such an arrangement permits two automobile body parts to be simultaneously attached to the automobile parts holder of the present invention. While second support arm 150 is shown in FIG. 2 below support arm 120, it is understood that second support arm 150 may be, for instance, integrally formed with support arm 120. More specifically, two sleeves 100 may be integrally connected, with each support arm extending in a direction opposite from one another.

While the preferred embodiment of the present invention have been described and depicted herein, alternative aspects may be effected by those skilled in the art to accomplish the same objectives. For instance, alternative automobile parts connectors, fasteners, and attachment units may be made to accommodate newly designed automobile body parts. Accordingly, it is intended by the appended claims to cover all such alternative aspects as fall within the true spirit and scope of the invention.

What is claimed is:

1. An adjustable, portable automobile parts holder, comprising:

a base having a front and a rear;

a vertically adjustable support leg extending upwardly from the rear of said base, said vertically adjustable support leg having a bottom and a top; and a substantially horizontally displaced rotatable cantilevered support arm extending from the top of said vertically displaced support leg for receiving an automobile body part attachment unit; and an automobile fender attachment unit slidably engageable to said rotatable cantilevered support arm.

2. The automobile parts holder of claim 1, wherein said fender attachment unit comprises:

a first elongated rod, and a second elongated rod, said first and second elongated rods having a top and a bottom;

a first connection arm linking together said first elongated rod to said second elongated rod wherein a substantially H-shaped member is formed;

a first collar attached to said connection arm, said first collar having a channel for removably receiving said rotatable cantilevered support arm;

a plurality of fender attachment connectors attached to said first elongated rod and second elongated rod for attaching an automobile fender thereon.

3. The automobile parts holder of claim 2, wherein said fender attachment unit further comprises:

a third elongated rod, and a fourth elongated rod, said third and fourth elongated rods having a top and a bottom;

a second connection arm linking together said third elongated rod to said fourth elongated rod so that a second substantially H-shaped member is formed;

a second collar attached to said connection arm, said second collar having a channel for removably receiving said rotatable cantilevered support arm;

a plurality of fender attachment connectors attached to said first elongated rod and second elongated rod for attaching an automobile fender thereon.

4. The automobile parts holder of claim 3, wherein said fender attachment unit further comprises a center arm for linking said first collar to said second collar so that a unitary structure is thereby formed.

5. The automobile parts holder of claim 3, wherein one of said plurality of fender attachment connectors comprises:

a block;

a first aperture located in said block for removable and slidable attachment of said block to one of said elongated rods;

a second aperture located in said block, said second aperture passing through said block in a direction substantially orthogonal to said first aperture;

a bar removably insertable into said second aperture, wherein said bar is rotatable in said second aperture, said bar having a fastener thereon for attaching said automobile fender to said fastener.

6. An adjustable, portable automobile parts holder, comprising:

a base having a front and a rear;

a vertically adjustable support leg extending upwardly from the rear of said base, said vertically adjustable support leg having a bottom and a top; and a substantially horizontally displaced rotatable cantilevered support arm extending from the top of said vertically displaced support leg for receiving an automobile body part attachment unit; and a door attachment unit slidably engageable to said rotatable cantilevered support arm.

7. The automobile parts holder of claim 6, wherein said door attachment unit comprises:

an first arm;

a first connection collar attached to said arm, said first connection collar having a housing for slidably and removably receiving said rotatable cantilevered support arm;

a plurality of door connection brackets slidably attachable to said arm, each of said plurality of door connection brackets having means for attaching an automobile door thereto.

8. The automobile parts holder of claim 7, wherein said door attachment unit comprises:

a second arm;

a second connection collar attached to said second arm, said second connection collar having a second housing for slidably and removably receiving said rotatable cantilevered support arm;

a plurality of door connection brackets slidably attachable to said second arm, each of said plurality of door connection brackets having means for attaching an automobile door thereto.

9. The automobile parts holder of claim 1, further comprising a second support arm extending from the top of said vertically displaced support leg for receiving a second automobile body part attachment unit.

10. The automobile parts holder of claim 6, further comprising a second support arm extending from the top of said vertically displaced support leg for receiving a second automobile body part attachment unit.

11. The automobile parts holder of claim 1 wherein said base comprises reinforcement rods extending therein.

12. The automobile parts holder of claim 1, wherein said base includes at least three wheels for mobility and portability of said automobile parts holder.

13. The automobile parts holder of claim 12, wherein at least one of said plurality of wheels includes a locking means for preventing movement of said automobile body parts holder.

14. The automobile parts holder of claim 1, wherein said vertically adjustable support leg comprises a telescoping tubing arrangement, said telescoping tubing arrangement including an inner tube slidably insertable within an outer tube.

15. The automobile parts holder of claim 14, wherein said telescoping tubing arrangement further comprises means for raising and lowering said vertically adjustable support leg.

16. The automobile parts holder of claim 15, wherein said means for raising and lowering said vertically adjustable support leg comprises a FULTON screw jack attached to said inner and said outer tube.

17. The automobile parts holder of claim 14, wherein said telescoping tubing arrangement further comprises locking means for securing said tubes in relation to one another.

18. The invention of claim 14, wherein said inner and outer tube comprise square steel tubing.

19. The automobile parts holder of claim 6 wherein said base comprises reinforcement rods extending therein.

20. The automobile parts holder of claim 6, wherein said vertically adjustable support leg comprises a telescoping tubing arrangement, said telescoping tubing arrangement including an inner tube slidably insertable within an outer tube and means for raising and lowering said vertically adjustable support leg.

\* \* \* \* \*